United States Patent
Beer et al.

[15] 3,652,170
[45] Mar. 28, 1972

[54] PHOTOMETER CHAMBER

[72] Inventors: Palle-Finn Beer; Kai Robert Smith, both of Lidingo, Sweden

[73] Assignee: AGA Aktiebolag, Lidingo, Sweden

[22] Filed: Feb. 5, 1970

[21] Appl. No.: 8,933

[30] Foreign Application Priority Data

Feb. 5, 1969 Sweden..................................1493/69

[52] U.S. Cl..............................................356/246, 250/218
[51] Int. Cl..........................................................G01n 1/10
[58] Field of Search..............................356/102–104, 207, 356/208, 244, 246; 250/218; 73/207, 208

[56] References Cited

UNITED STATES PATENTS

| | | | |
|---|---|---|---|
| 2,827,008 | 3/1958 | Hodge | 73/207 X |
| 2,866,379 | 12/1958 | Veit | 250/218 |
| 3,225,645 | 12/1965 | Baruch et al. | 356/246 |
| 3,246,559 | 4/1966 | Clifford, Jr. | 356/246 |
| 3,364,811 | 1/1968 | Baruch et al. | 250/218 X |
| 3,448,277 | 6/1969 | Jayko | 356/208 X |
| 3,520,517 | 7/1970 | Hrdina | 356/246 |

*Primary Examiner*—Ronald L. Wibert
*Assistant Examiner*—Warren A. Sklar
*Attorney*—Larson, Taylor & Hinds

[57] ABSTRACT

An apparatus useful for measuring the optical properties of a liquid which comprises a cylinder having at least a portion thereof constructed of a transparent material, inlet means at one end of said cylinder for introducing liquid into the cylinder, outlet means at the other end of said cylinder, a piston slidably mounted in said cylinder to define a first portion and a second portion in said cylinder, said first portion being adjacent to said inlet means, a passageway through said piston communicating with said first and second portions and with said outlet means, a valve means positioned in said passageway and adapted to close said passageway when the volume of said first portion is increased by movement of the piston and to open said passageway when the volume of said first portion is decreased by movement of the piston.

The apparatus permits reliable measurement of the transparency to light of light samples in the chamber by keeping the walls clean so that the light for one sample does not contaminate or otherwise affect a sample likewise subsequently drawn in.

8 Claims, 1 Drawing Figure

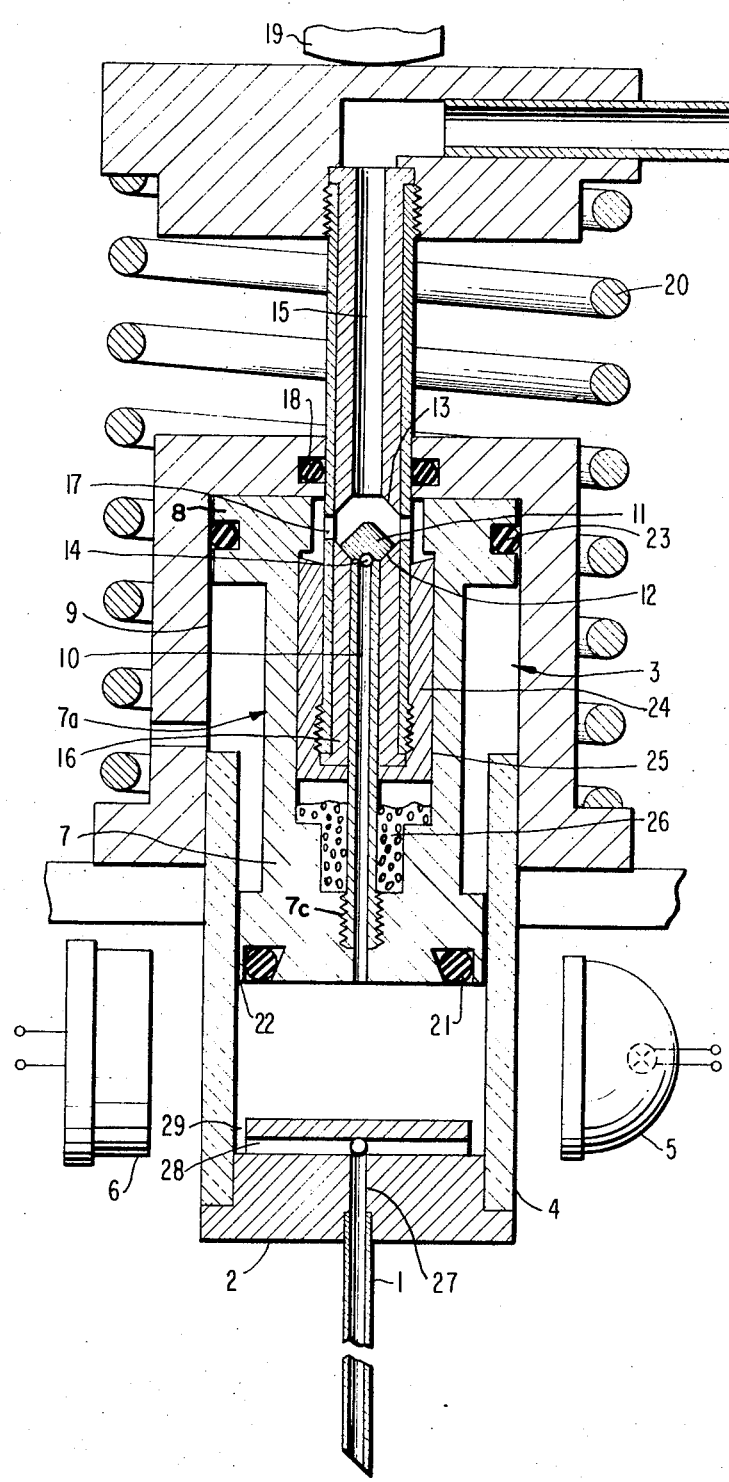

PHOTOMETER CHAMBER

This invention relates to a photometer chamber for measuring optical properties of a liquid such as the transparency to light. More particularly, the present invention relates to a photometer chamber comprising a cylinder having at least a portion of the cylinder wall constructed of transparent material and a pump piston slidably mounted in the cylinder as well as a means for introducing liquid, e.g., a tubular pin, connected to one of the end walls of the cylinder for drawing up liquid. The photometer chamber is intended to be used conventionally for drawing up liquid from a container, such as a test tube, through the tubular pin into the transparent portion of the cylinder, whereupon light from a light source is passed through the said portion and projected to a photocell. The transparency to light of the liquid in the chamber can then be determined by comparison with a standard.

When a photometer chamber of this type is used for repeated measurements of different kinds of liquids, it is important in view of the reliability of the result that there should be present in the chamber during each measurement only the liquid which is being investigated, and it should contain no trace of previously investigated liquids, which could affect the result of measurement. This object is achieved by an apparatus comprising a cylinder having at least a portion thereof constructed of a transparent material, inlet means at one end of said cylinder for introducing liquid into the cylinder, outlet means at the other end of said cylinder, a piston slidably mounted in said cylinder to define a first portion and a second portion in said cylinder, said first portion being adjacent to said inlet means, a passageway through said piston communicating with said first and second portions and with said outlet means, a valve means positioned in said passageway and adapted to close said passageway when the volume of said first portion is increased by movement of the piston and to open said passageway when the volume of the first portion is decreased by movement of the piston.

Thus, the photometer chamber of the invention is characterized in that the piston forms a part of a piston system which is movable in the cylinder and is constructed in cooperation with the cylinder to draw liquid into the tubular pin and into the cylinder when the piston moves in one as well as in the other direction within the cylinder. Connected to the other end wall of the cylinder is an outlet tube for the liquid. Consequently, at the same time as the chamber is being kept clean on the inside by the piston rubbing off the cylinder surface with each stroke, liquid always moves in the opposite direction from the pin and into the cylinder and is prevented during any of the work period from moving from the interior of the cylinder towards the pin.

The invention will be further described by reference to the accompanying drawing which is a side elevation partially in cross section of the apparatus of the invention in operation. The photometer chamber shown in the drawing is provided with a tubular pin 1, through which liquid is to be drawn from a container not shown on the drawing. The pin is connected to one end wall 2 of a cylinder indicated generally as 3, a portion of which is transparent. For this purpose, the wall 4 is of glass although other transparent materials can be used for this portion of the cylinder. From a light source 5, light passes through the transparent portion 4 of the cylinder and reaches a photocell 6. The light source 5 can be provided with optical elements in known manner for creating, for instance, a beam of parallel light or light converging towards the center of the cylinder 3.

Within the cylinder 3 is slidably mounted a piston indicated generally as 7a comprising a first piston section 7 and a second piston section 8 attached thereto. The second or upper piston section 8 and the corresponding portion 9 of the cylinder is of larger diameter than the first or lower piston section 7 and the corresponding portion of the cylinder 3.

The two portions of the cylinder are connected through a passageway such as a conduit which, in the embodiment shown on the drawing, extends through the composite piston 7a comprising piston sections 7 and 8. The conduit is preferably a tube 10 which is attached to the piston section 7 such as by attachment means 7C. The upper portion of the tube 10 forms and is fixed to a valve member 11 cooperating alternately with a lower valve seat 12 and an upper valve seat 13. In the position shown on the drawing, the valve member 11 is seated on the lower seat 12 and the tube 10 is blocked. When the valve member 11 leaves the lower valve seat 12, liquid can pass from the tube 10 through an aperture 14 provided in the wall of the tube and into the upper portion of the cylinder 3.

The valve seats 12 and 13 are fastened to an outlet means such as an outlet tube 15 connected to the upper end wall of the cylinder 3 in such a way that the upper valve seat 13 forms the end of this tube and the valve seat 12 is attached to an extension 16 of the outlet tube 15. To enable liquid to pass to the tube 15, this is also provided with apertures 17 in the wall connecting with the upper portion of the cylinder 3.

The exhaust tube 15 is displaceable in the axial direction relative to the cylinder 3 and is sealed by a sealing means 18 against the upper end wall of the cylinder 3. The displacement of outlet tube 15 is obtained by means of a control member such as a member 19 which, for example, may be the piston of a pneumatic cylinder and which can move the outlet tube 15 downwardly and into the cylinder 3 against the action of a pressure spring 20.

When the outlet tube 15 is pressed into the cylinder 3 by means of control member 19, the valve seat 12 first disengages the valve member 11 and the seat 13 is then brought into engagement with the valve member 11. This opens the connection between the lower and the upper portion of the cylinder 3 and closes the outlet tube 15. Continued downward movement of the outlet tube 15 causes the piston sections 7 and 8 to move downwardly in the cylinder 3. This movement reduces the volume of the lower portion surrounded by the cylinder wall 4 at the same time as the volume of the upper portion surrounded by the cylinder wall 9 increases. Since the increase in volume is larger in the upper portion, the result is that liquid is drawn up through pin 1 during downward movement of the piston system. At the same time, the inside of the transparent cylinder wall 4 is rubbed clean by the piston section 7 whose sealing member provided in the lower portion thereof comprises an elastic ring 21 which presses a sharp edge 22 of the piston section 7 against the cylinder wall. The upper piston section 8 is also provided with a sealing member 23 which does not, however, have to provide a cleaning function.

When the piston section 7 has reached the end position and engaged the lower end surface of the cylinder 3, the liquid drawn out through the pin 1 has been transferred to the upper space within the cylinder 3 above the piston section 8 and also fills the conduit 10. In this end position, the valve seat 13 is pressed against the cylinder member 11 and guarantees positive sealing. The outlet tube 15 is then moved upwardly under the influence of the spring 20 whereupon the valve seat 13 first disengages the valve member 11 and valve seat 12 engages the same. This opens the connection between the upper space within the cylinder 3 and the outlet tube 15 at the same time as the conduit 10 is closed. Continued upward movement of the outlet tube 15 causes the piston 7a to be drawn upwardly whereby liquid is drawn in through the pin 1 into the lower space within the cylinder 3 where the optical properties thereof can be measured in the manner referred. At the same time, the upper portion of the cylinder 3 is emptied through the outlet tube 15. The process is then repeated in the manner described.

In the embodiment of the arrangement just described, it is possible for an occasional droplet to be forced out of the pin 1 when the outlet tube 15 is moved from the position shown on the drawing into the cylinder 3. This is due to the fact that the portion of the tube 15 which enters diminishes the total volume of the cylinder 3. This drawback can be avoided by providing an inner piston 24 within the piston 7a. The inner piston 24 is fixed to the outlet tube 15 and is slidable along tube 10 within an inner piston cylinder 25 which is formed in the member mechanically connecting the piston sections 7 and 8. During the first phase of the movement of the outlet tube in the cylinder 3 referred to above, the piston 24 will then move downwardly relative to the piston 7a and the increase in volume then taking place above the piston 24 is larger than the reduction in the volume of the cylinder 3 caused by the entering of the outlet tube 15. This continues until the valve seat 13 engages valve member 11 after which the actuation of the piston 7a from the outlet tube 15 takes place via the tube 10 which is attached to the lower piston section 7 and carries at the upper end thereof the valve member 11.

For the inner piston 24 to operate in the manner just described, it is necessary that the space 26 in the piston 7a and the piston 24 contain a compressible medium. This medium can be air which can be enclosed, for example, in the cavities of a plastic foam. It is also possible to segregate the lower portion of the space 26 from the upper one by means of a membrane of similar construction as the membrane of aneroid barometer.

It is apparent from the above description of the arrangement and its operation that the valves are guided in their movements and furthermore pressure-loaded in the end positions whereby leakages during the operative state are eliminated. If the arrangement is such as to make the outlet tube issue at a level which is lower than that of the end of the pin 1, dripping is eliminated even if the valve should leak temporarily, for instance, owing to a particle having become jammed between the valve member and the valve seat.

To obtain reliable measurements of the transparency to light of the liquid in the chamber, it is essential that the walls be kept clean and that liquid from one sample not affect a sample liquid subsequently drawn in. To this end, the piston section 7 is constructed as mentioned above so as to rub clean the inside of the chamber during its downward movement in the cylinder 3. Furthermore, the fastening of the pin 1 to the end wall 2 is such as to make the liquid when entering to be conducted towards the cylinder wall of the chamber and rinse it clean. This is obtained by the provision on the extension 27 of the pin 1 within the end wall 2 of a number of radial or diametrical borings 28 which issue in a notch 29 along the circumference of the end wall 2. This not only causes the liquid to flow towards the inner wall of the cylinder but also, especially when the piston is close to the end wall 2 during its movement, the liquid will rinse clean the opposed surfaces of the piston section 7 and the wall 2.

It is claimed:

1. An apparatus useful for measuring the optical properties of a liquid which comprises a cylinder having end wall portions, said cylinder having at least a portion thereof constructed of a transparent material, inlet means coupled to said cylinder through one of said end wall portions for introducing liquid into the cylinder, outlet means coupled to said cylinder through the other of said end wall portions a piston slidably mounted in said cylinder to define a first portion and a second portion in said cylinder, means for moving said piston, said first portion being adjacent to and communicating with said inlet means, and said second portion being adjacent to and communicating with said outlet means, a passageway through said piston communicating with said first and second portions, a valve means positioned in said passageway to close said passageway when the volume of said first portion is increased by movement of the piston and to open said passageway when the volume of said first portion is decreased by movement of the piston.

2. The apparatus of claim 1 wherein the first portion of said cylinder is of larger diameter than the second portion of said cylinder and said piston is comprised of a first piston section cooperating with the first portion of said cylinder and a second piston section cooperating with the second portion of said cylinder.

3. The apparatus of claim 2 wherein the passageway through the piston is in the form of a passage tube.

4. The apparatus of claim 3 wherein the valve means in said passage tube is a reversing valve for alternately connecting the second portion of the cylinder with the first portion of the cylinder or with the outlet means.

5. The apparatus of claim 4 wherein the valve means comprises a valve member fastened to said passage tube, a pair of valve seats movable relative to said valve member, one valve seat being positioned at the end of said outlet means and the other valve seat being fastened to said passage tube.

6. The apparatus of claim 4 further comprising an inner piston and wherein the outlet means is an outlet tube fastened to said inner piston, said outlet tube and said inner piston being movable relative to the piston and sealed thereagainst, said inner piston having an upper end surface joining the said second portion of the cylinder and having an area relative to the cross-sectional area of the outlet tube such that the outlet tube when entering the cylinder and during the part of the movement when one of the valve seats disengages the valve member and the other valve seat is brought into engagement with the valve member, the movement of the inner piston causes an increase in the free volume of the cylinder which is larger than the decrease of the free volume owing to the entering of the outlet tube.

7. The apparatus of claim 6 wherein said inner piston includes a lower end surface that delimits a closed space in the piston system which contains a compressible medium.

8. The apparatus of claim 1 wherein the inlet means for introducing the liquid is a tubular pin and said tubular pin projects through the one of said end wall portions of said cylinder through the cylinder adjacent the cylindrical wall thereof, said end wall having a notch which connects with said tubular pin via radial conduits.

* * * * *